(12) United States Patent
Demsey et al.

(10) Patent No.: US 11,593,839 B2
(45) Date of Patent: *Feb. 28, 2023

(54) METHODS AND SYSTEMS FOR DETERMINING EXPOSURE TO FIXED-LOCATION DYNAMIC DISPLAYS

(71) Applicant: Verizon Media Inc., Dulles, VA (US)

(72) Inventors: Seth Mitchell Demsey, Dulles, VA (US); Jay Crystal, Arlington, VA (US); Smitha Surapaneni, McLean, VA (US)

(73) Assignee: Yahoo Ad Tech LLC, Dulles, VA (US)

( * ) Notice: Subject to any disclaimer, the term of this patent is extended or adjusted under 35 U.S.C. 154(b) by 190 days.

This patent is subject to a terminal disclaimer.

(21) Appl. No.: 16/895,463

(22) Filed: Jun. 8, 2020

(65) Prior Publication Data
US 2020/0372540 A1 Nov. 26, 2020

Related U.S. Application Data

(63) Continuation of application No. 15/443,613, filed on Feb. 27, 2017, now Pat. No. 10,692,107.

(51) Int. Cl.
*G06Q 30/00* (2012.01)
*G06Q 30/0251* (2023.01)
(Continued)

(52) U.S. Cl.
CPC ..... *G06Q 30/0261* (2013.01); *G06F 16/9537* (2019.01); *H04W 4/021* (2013.01); *H04W 8/22* (2013.01)

(58) Field of Classification Search
None
See application file for complete search history.

(56) References Cited

U.S. PATENT DOCUMENTS 5,214,793 A * 5/1993 Conway ............... G09B 29/106
455/500
5,257,017 A * 10/1993 Jones ..................... G09F 19/18
345/13
(Continued)

FOREIGN PATENT DOCUMENTS

JP 2014053897 A * 3/2014 ......... H04L 41/0886
JP 2014053897 A 3/2014
(Continued)

OTHER PUBLICATIONS

Government of South Australia. Advertising Signs Assessment Guidelines for Road Safety. (Aug. 2014). Retrieved online Jan. 22, 2020. https://www.dpti.sa.gov.au/data/assets/pdf_file/0019/145333/DPTI-Advertising-Signs-Assessment-Guidelines.pdf (Year: 2014).*

(Continued)

*Primary Examiner* — James A Reagan
(74) *Attorney, Agent, or Firm* — Bookoff McAndrews, PLLC

(57) ABSTRACT

Systems and methods are disclosed for executing the electronic distribution of electronic content to a dynamic display. The method includes receiving, from an advertiser or content provider, a request to transmit electronic content to the dynamic display, identifying a first geographical zone associated with the fixed location; identifying a second geographical zone associated with the fixed location; generating a plurality of directional vectors for quantifying the displacement of any one of the plurality of electronic devices traveling between the first geographical zone and the second geographical zone; identifying a displacement pattern generated by the plurality of directional vectors for the plurality of electronic devices traveling between the first geographical zone and the second geographical zone; tailoring the electronic content based on the displacement pattern generated (Continued)

by the plurality of directional vectors; and transmitting the electronic content to the dynamic display associated with the fixed location.

20 Claims, 6 Drawing Sheets

(51) Int. Cl.
*H04W 4/021* (2018.01)
*G06F 16/9537* (2019.01)
*H04W 8/22* (2009.01)

(56) References Cited

U.S. PATENT DOCUMENTS

| | | | | |
|---|---|---|---|---|
| 5,543,856 A * | 8/1996 | Rosser | H04N 5/272 | 348/E7.024 |
| 6,484,148 B1 * | 11/2002 | Boyd | G06Q 30/0267 | 340/8.1 |
| 7,268,700 B1 * | 9/2007 | Hoffberg | G06Q 50/01 | 340/995.13 |
| 7,293,235 B1 * | 11/2007 | Powers | G06T 7/20 | 463/9 |
| 7,769,632 B2 * | 8/2010 | Giraud | G06Q 30/0269 | 455/39 |
| 7,796,155 B1 * | 9/2010 | Neely, III | G06V 20/52 | 348/157 |
| 8,373,582 B2 * | 2/2013 | Hoffberg | G08G 1/166 | 340/995.13 |
| 8,489,127 B2 * | 7/2013 | Huang | H04W 4/02 | 455/457 |
| 8,629,789 B2 * | 1/2014 | Hoffberg | G08G 1/166 | 340/995.13 |
| 8,706,552 B1 * | 4/2014 | Benjamin | G06Q 30/0252 | 705/14.5 |
| 8,792,917 B2 * | 7/2014 | Huang | H04W 4/18 | 455/457 |
| 8,838,481 B2 * | 9/2014 | Moshfeghi | G01S 5/0236 | 705/16 |
| 9,524,584 B2 * | 12/2016 | Rodriguez | H04N 21/8358 | |
| 9,551,582 B2 * | 1/2017 | Hoffberg | G01C 21/3691 | |
| 9,872,149 B2 * | 1/2018 | Alsehly | H04W 4/029 | |
| 10,127,816 B2 * | 11/2018 | Hoffberg | G08G 1/20 | |
| 10,333,980 B2 * | 6/2019 | Ting | H04L 63/10 | |
| 10,546,326 B2 * | 1/2020 | Publicover | G06F 16/24575 | |
| 10,692,107 B2 * | 6/2020 | Demsey | G06F 16/9537 | |
| 2001/0026276 A1 | 10/2001 | Sakamoto et al. | | |
| 2002/0111146 A1 * | 8/2002 | Fridman | G09F 21/04 | 455/99 |
| 2003/0046162 A1 * | 3/2003 | Nestel | G06Q 30/02 | 705/14.66 |
| 2003/0149601 A1 * | 8/2003 | Cabral | G06Q 10/02 | 705/5 |
| 2003/0222134 A1 * | 12/2003 | Boyd | G06Q 30/0261 | 235/375 |
| 2005/0004842 A1 * | 1/2005 | Mammen | G06Q 30/02 | 705/14.62 |
| 2006/0022833 A1 * | 2/2006 | Ferguson | G08B 21/0288 | 340/539.13 |
| 2006/0064346 A1 | 3/2006 | Steenstra et al. | | |
| 2006/0170670 A1 * | 8/2006 | Burke | G07F 17/16 | 345/418 |
| 2006/0287913 A1 * | 12/2006 | Baluja | G06Q 30/0241 | 705/14.54 |
| 2007/0163158 A1 * | 7/2007 | Bentz | G09F 15/00 | 40/329 |
| 2007/0204032 A1 * | 8/2007 | Strand | H04L 67/28 | 709/224 |
| 2007/0239537 A1 * | 10/2007 | Protheroe | G06Q 30/0277 | 705/14.54 |
| 2008/0060003 A1 * | 3/2008 | Nocifera | G06Q 30/02 | 725/35 |
| 2008/0167908 A1 * | 7/2008 | Marcken | G06Q 10/02 | 705/5 |
| 2008/0167909 A1 * | 7/2008 | de Marcken | G06Q 50/14 | 705/5 |
| 2008/0290987 A1 * | 11/2008 | Li | G10L 25/00 | 340/5.1 |
| 2009/0030788 A1 * | 1/2009 | Boudah | G09F 15/00 | 705/14.71 |
| 2009/0049097 A1 * | 2/2009 | Nocifera | G06Q 30/02 | 709/224 |
| 2009/0153348 A1 * | 6/2009 | Zai | G06Q 30/02 | 340/5.1 |
| 2009/0276317 A1 * | 11/2009 | Dixon | G06Q 10/087 | 705/14.61 |
| 2009/0299857 A1 * | 12/2009 | Brubaker | G06Q 30/02 | 705/14.66 |
| 2010/0114707 A1 * | 5/2010 | Athsani | G06Q 30/02 | 705/14.58 |
| 2010/0228632 A1 * | 9/2010 | Rodriguez | G06T 3/0006 | 705/14.66 |
| 2011/0035282 A1 * | 2/2011 | Spatscheck | G06Q 30/0273 | 705/14.69 |
| 2011/0161160 A1 * | 6/2011 | Carlson | G06F 3/013 | 705/14.41 |
| 2011/0256881 A1 * | 10/2011 | Huang | H04W 4/02 | 455/456.1 |
| 2012/0221385 A1 * | 8/2012 | Fine | G09F 7/04 | 348/837 |
| 2013/0030931 A1 * | 1/2013 | Moshfeghi | H04W 4/027 | 705/16 |
| 2013/0060642 A1 * | 3/2013 | Shlomot | G06Q 30/0241 | 705/14.66 |
| 2013/0165070 A1 * | 6/2013 | Hoffberg | G08G 1/166 | 455/456.3 |
| 2013/0166387 A1 * | 6/2013 | Hoffberg | G08G 1/093 | 705/14.63 |
| 2013/0196692 A1 * | 8/2013 | Huang | H04W 4/027 | 455/457 |
| 2013/0290106 A1 * | 10/2013 | Bradley | G06Q 90/20 | 705/323 |
| 2013/0297422 A1 | 11/2013 | Hunter et al. | | |
| 2014/0057648 A1 | 2/2014 | Lyman et al. | | |
| 2014/0162692 A1 | 6/2014 | Li et al. | | |
| 2014/0164118 A1 | 6/2014 | Polachi | | |
| 2014/0304072 A1 | 10/2014 | Rider et al. | | |
| 2015/0051993 A1 * | 2/2015 | Moshfeghi | G06K 19/0712 | 705/18 |
| 2015/0084838 A1 * | 3/2015 | Chang | G06F 3/1454 | 345/2.1 |
| 2016/0025500 A1 * | 1/2016 | Hoffberg | H04W 4/024 | 701/423 |
| 2016/0140614 A1 * | 5/2016 | Brubaker | G06Q 30/02 | 705/14.46 |
| 2016/0142443 A1 * | 5/2016 | Ting | H04W 4/02 | 726/1 |
| 2016/0253710 A1 * | 9/2016 | Publicover | H04N 21/252 | 705/14.66 |
| 2017/0201779 A1 * | 7/2017 | Publicover | H04N 21/25883 | |
| 2017/0236347 A1 * | 8/2017 | Drako | G07C 9/23 | 340/5.33 |
| 2018/0089717 A1 * | 3/2018 | Morin | G09G 5/005 | |
| 2018/0089938 A1 * | 3/2018 | Lutnick | G07F 17/34 | |
| 2018/0206065 A1 * | 7/2018 | Moshfeghi | G01S 5/0009 | |
| 2019/0342342 A1 * | 11/2019 | Ting | H04W 4/02 | |

FOREIGN PATENT DOCUMENTS

| | | | | |
|---|---|---|---|---|
| JP | 2014115796 A * | 6/2014 | | G06Q 30/0261 |
| JP | 2014115796 A | 6/2014 | | |
| WO | WO-2008048692 A2 * | 4/2008 | | G09G 3/045 |
| WO | WO 2008048692 A2 | 4/2008 | | |

OTHER PUBLICATIONS

Ornstead, Gene. Dynamic vs. Static Signage: The Advantages of Digital. (Feb. 25, 2015). Retrieved online Jan. 22, 2020. https://

(56) References Cited

OTHER PUBLICATIONS www.viewsonic.com/us/downloads/dl/file/id/550/product/0/dynamic_vs_static_signage_the_advantages_of_digital.pdf (Year: 2015).*
New York State Department of State. Municipal Control of Signs. (Aug. 2015). Retrieved online Jan. 22, 2020. https://www.dos.ny.gov/lg/publications/Municipal%20Control%20of%20Signs.pdf (Year: 2015).*
Extended European Search Report dated Aug. 10, 2020, in corresponding European Patent Application No. 18756626.0, filed on Feb. 1, 2018 (9 pages).
International Search Report and Written Opinion issued in corresponding International Application No. PCT/US2018/16386, dated Apr. 25, 2018 (10 pages).

\* cited by examiner

METHODS AND SYSTEMS FOR DETERMINING EXPOSURE TO FIXED-LOCATION DYNAMIC DISPLAYS

CROSS-REFERENCE TO RELATED APPLICATIONS

This application is a continuation of and claims the benefit of priority to pending U.S. application Ser. No. 15/443,613, filed on Feb. 27, 2017, which is incorporated by reference herein in its entirety.

TECHNICAL FIELD

Various embodiments of the present disclosure relate generally to the electronic distribution of electronic content to dynamic displays. More specifically, exemplary embodiments of the present disclosure relate to systems and methods for tailoring electronic content distributed to dynamic displays based on modeling predictive analytics for electronic devices traveling between a first geographical zone and a second geographical zone relative to a fixed location.

BACKGROUND

Digital out-of-home (DOOH) inventory generally refers to ads, content, and video showcased to potential consumers outside the home. The message delivery to potential consumers is generally supported by rich and dynamic digital technology (e.g., dynamic displays), maximized with real-time capabilities to target consumers on-the-go. The dynamic displays associated with DOOH inventory may encompass a variety of screen shapes, sizes, and level of interactivity. From digital billboards and signs atop taxis, to place-based digital messaging at airport gates, gyms, and waiting rooms, DOOH inventory has the potential to bridge between context and location.

While delivery of the electronic content to targeted dynamic displays may be simple for the advertiser, the effectiveness of exposure to potential consumers has been more difficult to measure. A common solution, for example, has been to use survey-based methodologies to determine whether the electronic content had been seen. But this solution tends to be a more coarse approach that may not account for regular travel patterns of potential consumers on-the-go.

Accordingly, a need exists for methods and systems for determining travel patterns of potential consumers to provide electronic content providers with finer granularity in data to improve exposure effectiveness of electronic content delivered to dynamic displays.

SUMMARY

According to certain embodiments, systems and methods are disclosed for executing the electronic distribution of electronic content to a dynamic display. One method may include, receiving, from an advertiser or content provider, a request to transmit electronic content to the dynamic display, wherein the dynamic display is associated with a fixed location, wherein the electronic content is directed to a desired subset of individuals associated with a plurality of electronic devices, and wherein the electronic content relates to a target location affiliated with the advertiser or content provider; identifying a first geographical zone associated with the fixed location; identifying a second geographical zone associated with the fixed location; generating a plurality of directional vectors for quantifying the displacement of any one of the plurality of electronic devices traveling between the first geographical zone and the second geographical zone, wherein generating a directional vector comprises the steps: (a) receiving an indication that a first one of the plurality of electronic devices is present in the first geographical zone, (b) storing, in a database associated with the dynamic display, first position information relating to the presence of the first one of the plurality of electronic devices in the first geographical zone, (c) receiving an indication that the first one of the plurality of electronic devices is present in the second geographical zone, (d) storing, in the database associated with the dynamic display, second position information relating to the presence of the first one of the plurality of electronic devices in the second geographical zone, (e) generating a directional vector of the one of the plurality of electronic devices based on the first position information and the second position information, (f) storing, in the database associated with the dynamic display, the directional vector of the one of the plurality of electronic devices, and (g) repeating steps (a) through (f) to generate a directional vector for a different one of the plurality of the electronic devices of the desired subset of individuals; storing, in a database associated with the dynamic display, the plurality of directional vectors generated for the plurality of electronic devices traveling between the first geographical zone and the second geographical zone; identifying a displacement pattern generated by the plurality of directional vectors for the plurality of electronic devices traveling between the first geographical zone and the second geographical zone; tailoring the electronic content based on the displacement pattern generated by the plurality of directional vectors; and transmitting the electronic content to the dynamic display associated with the fixed location.

According to certain embodiments, systems are disclosed for managing the electronic distribution of electronic content to a dynamic display. One system includes a data storage device storing instructions for managing the electronic distribution of electronic content to the dynamic display, wherein the dynamic display is associated with a fixed location; and a processor configured to execute the instructions to perform a method. The method may include receiving, from an advertiser or content provider, a request to transmit electronic content to the dynamic display, wherein the dynamic display is associated with a fixed location, wherein the electronic content is directed to a desired subset of individuals associated with a plurality of electronic devices, and wherein the electronic content relates to a target location affiliated with the advertiser or content provider; identifying a first geographical zone associated with the fixed location; identifying a second geographical zone associated with the fixed location; generating a plurality of directional vectors for quantifying the displacement of any one of the plurality of electronic devices traveling between the first geographical zone and the second geographical zone, wherein generating a directional vector comprises the steps: (a) receiving an indication that a first one of the plurality of electronic devices is present in the first geographical zone, (b) storing, in a database associated with the dynamic display, first position information relating to the presence of the first one of the plurality of electronic devices in the first geographical zone, (c) receiving an indication that the first one of the plurality of electronic devices is present in the second geographical zone, (d) storing, in the database associated with the dynamic display, second position information relating to the presence of the first one of the plurality of electronic devices in the second geographical zone, (e) generating a directional vector of the one of the plurality of electronic devices based on the first position information and the second position information, (f) storing, in the database associated with the dynamic display, the directional vector of the one of the plurality of electronic devices, and (g) repeating steps (a) through (f) to generate a directional vector for a different one of the plurality of the electronic devices of the desired subset of individuals; storing, in a database associated with the dynamic display, the plurality of directional vectors generated for the plurality of electronic devices traveling between the first geographical zone and the second geographical zone; identifying a displacement pattern generated by the plurality of directional vectors for the plurality of electronic devices traveling between the first geographical zone and the second geographical zone; tailoring the electronic content based on the displacement pattern generated by the plurality of directional vectors; and transmitting the electronic content to the dynamic display associated with the fixed location.

According to certain embodiments, a computer-readable medium is disclosed that, when executed by a computer system, causes the computer system to perform a method for managing the electronic distribution of electronic content to a dynamic display, the method including: receiving, from an advertiser or content provider, a request to transmit electronic content to the dynamic display, wherein the dynamic display is associated with a fixed location, wherein the electronic content is directed to a desired subset of individuals associated with a plurality of electronic devices, and wherein the electronic content relates to a target location affiliated with the advertiser or content provider; identifying a first geographical zone associated with the fixed location; identifying a second geographical zone associated with the fixed location; generating a plurality of directional vectors for quantifying the displacement of any one of the plurality of electronic devices traveling between the first geographical zone and the second geographical zone, wherein generating a directional vector comprises the steps: (a) receiving an indication that a first one of the plurality of electronic devices is present in the first geographical zone, (b) storing, in a database associated with the dynamic display, first position information relating to the presence of the first one of the plurality of electronic devices in the first geographical zone, (c) receiving an indication that the first one of the plurality of electronic devices is present in the second geographical zone, (d) storing, in the database associated with the dynamic display, second position information relating to the presence of the first one of the plurality of electronic devices in the second geographical zone, (e) generating a directional vector of the one of the plurality of electronic devices based on the first position information and the second position information, (f) storing, in the database associated with the dynamic display, the directional vector of the one of the plurality of electronic devices, and (g) repeating steps (a) through (f) to generate a directional vector for a different one of the plurality of the electronic devices of the desired subset of individuals; storing, in a database associated with the dynamic display, the plurality of directional vectors generated for the plurality of electronic devices traveling between the first geographical zone and the second geographical zone; identifying a displacement pattern generated by the plurality of directional vectors for the plurality of electronic devices traveling between the first geographical zone and the second geographical zone; tailoring the electronic content based on the displacement pattern generated by the plurality of directional vectors; and transmitting the electronic content to the dynamic display associated with the fixed location.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1A:
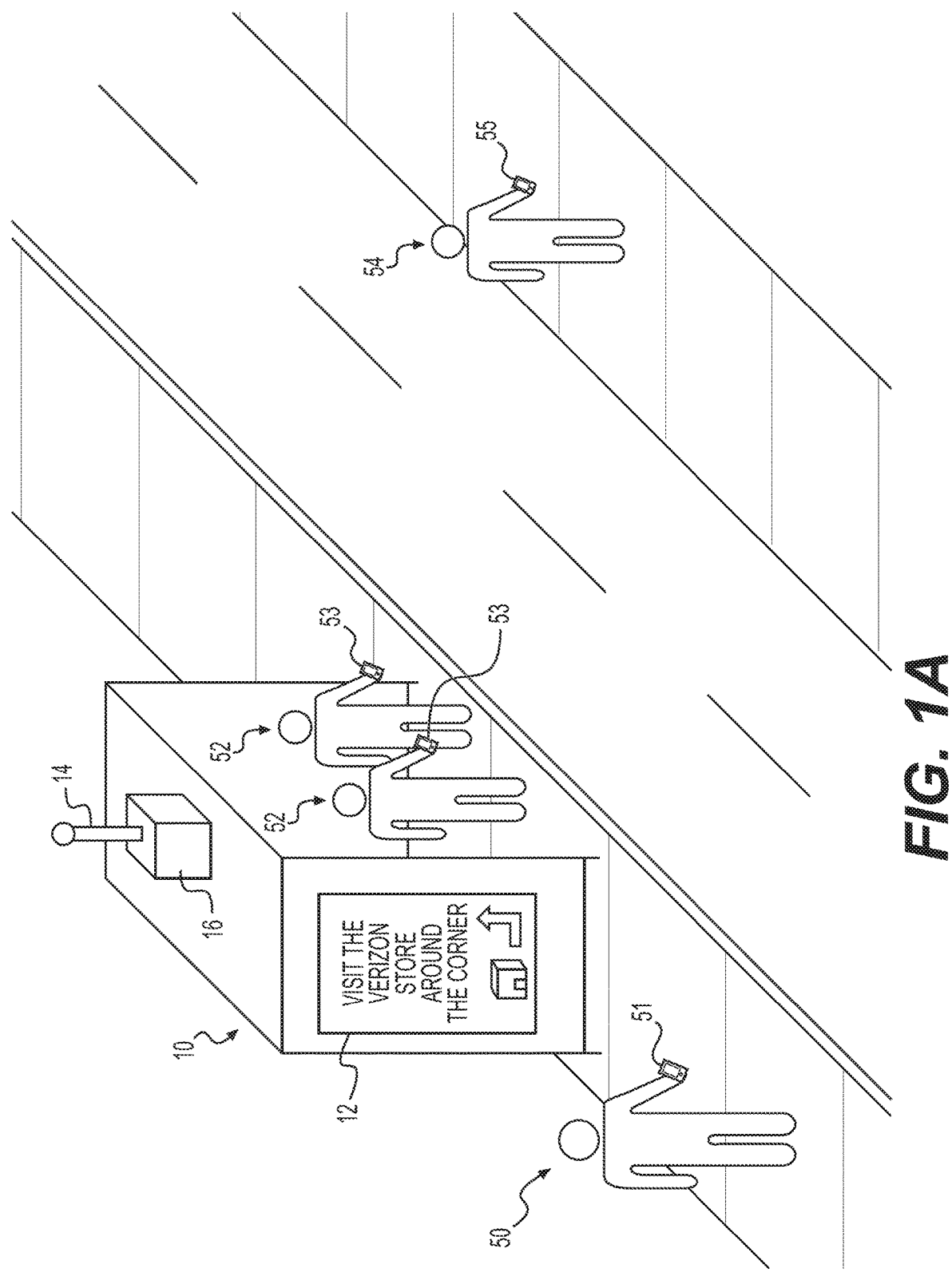
FIG. 1A is an illustration of scenario in which a subset of individuals associated with electronic devices are traveling relative to a dynamic display, according to an exemplary embodiment of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes methods and systems for detecting the movement of an electronic device to determine the movement of a user (e.g., potential consumer on-the-go), and presenting the user with DOOH inventory (e.g., electronic content) at dynamic displays based on travel patterns of the user. Electronic content providers, such as advertisers and content publishers, generally deliver DOOH inventory to dynamic displays in a variety of formats, including stand-alone screens, kiosks, jumbotrons, interactive media, and other formats found in public places. Specifically, the present disclosure describes methods and systems for presenting electronic content to a user based on, e.g., the movement of a user relative to predefined geographic zones, such as geofences, associated with a fixed location and where the position of the fixed location is optimized based on travel patterns of the user. In some embodiments, methods and systems are disclosed for presenting electronic content to a user based on the user's movement (e.g., detected via the user's device location) relative to a retail location (e.g., a "brick and mortar"), a road location (e.g., a highway exit or road intersection), a public venue (e.g. a stadium or theater), a commercial building, or any another point of interest.

The use of electronic maps has become widespread through the use of in-vehicle or portable global positioning system ("GPS") devices, mobile devices, and other electronic devices. These electronic maps often convey information about roads, traffic, buildings, landmarks, terrain, etc., related to geographical regions of interest. Some electronic maps may be interactive, allowing users, for example, to view their current location on a map of a particular area and the surrounding areas. Many providers of electronic mapping services allow users to input origin and destination locations and provide various routing directions to and from those locations. The routing directions may be generated based on one or more of travel time, travel distance, traffic, construction, rout preference (e.g., tolls, highways, etc.), and time-of-day. Electronic map providers may determine and update routing information based on a user's location using GPS or other location detecting means transmitted via a signal emitted by a user's electronic device. Based on this location information, the electronic maps may provide users with real-time information, such as live traffic information and dynamic routing adjustments.

Electronic content providers, such as advertisers and content publishers, have been using such electronic maps to send electronic content to users. Some content providers, for example, may target users within a predetermined geographic zone so that users within the zone receive the targeted content. The predetermined geographic zones, commonly referred to as geo-fences or geofences, are digital, virtual boundaries having a predetermined size. The geofences may be created by leveraging GPS data and various forms wireless technology, including the use of beacons, WIFI, Bluetooth, and so on. Electronic content providers, such as national advertisers, often approach geographic targeting by constructing geofences around various locations. For example, some content providers detect the presence of an electronic device user within a certain radius of a target location, or encourage users to inform the content provider of their presence by "checking-in." However, these radius or other geographic based methods of providing electronic content may be arbitrary and may not account for variations (e.g., the presence of the advertised goods, services, point-of-interest ("POI"), or target location) within different geographic regions, or they may not account for travel patterns of potential consumers on-the-go.

As a result, according to certain embodiments, systems and methods are described for creating geofences that assist in quantifying and relaying the movement of electronic devices (associated with consumers on-the-go) traveling between defined points-of-interest. Electronic content may then be tailored by content providers according to identifiable travel patterns generated by the movement of potential consumers traveling between respective geofences.

FIG. 1A is an illustration of a scenario, according to an embodiment of the present disclosure, in which a content provider transmits electronic content to a digital display 12 targeting potential consumers on-the-go. Dynamic display 12 may be associated with a fixed location 16 that defines a geographical zone or geofence to monitor the movement of nearby electronic devices. Fixed location 16 may be connected to antenna 14 to enable wireless communication to dynamic display 12 and/or to communication networks associated with the content providers. In this example, dynamic display 12 may be located at a bus stop 10 where potential consumers may regularly frequent for traveling. Dynamic display 12 may be positioned inside and/or outside bus stop 10 to maximize exposure to potential consumers nearby. The content providers may then tailor the electronic content transmitted to digital display 12 based on the likelihood that potential consumers traveling nearby will view the transmitted electronic content. For example, user 52 may be a potential consumer with an electronic device 53 and may be more likely in view of dynamic display 12 because they are closest to dynamic display 12. User 50 may be a potential consumer with an electronic device 51 and may also be within view of dynamic display 12 because they are approaching dynamic display 12. User 54, however, may be a potential consumer with an electronic device 55 and may likely be out of view because they are too remote from dynamic display 12.

Figure 1B:
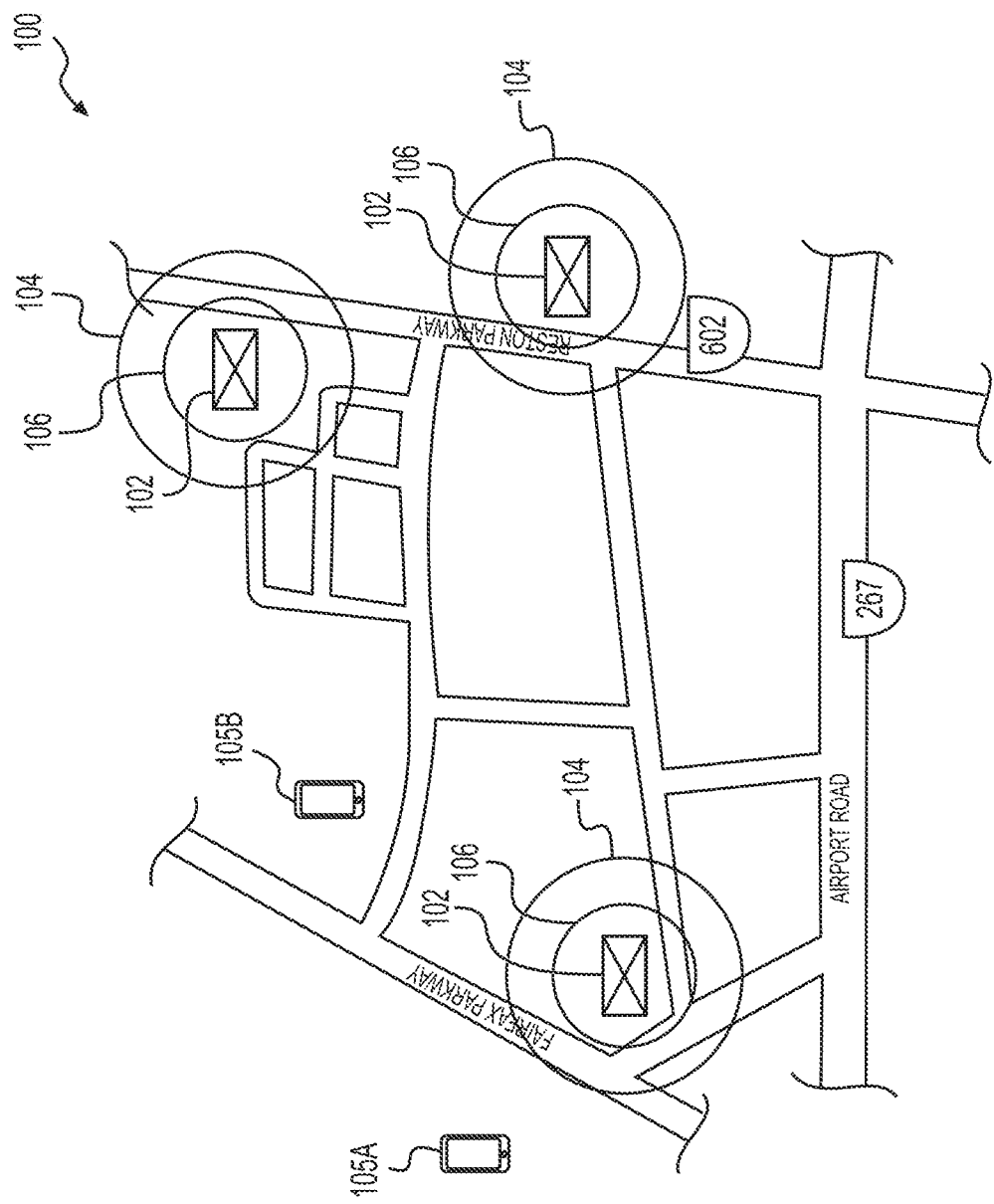
FIG. 1B is an illustration of an electronic map overlaid by a plurality of geofences or geographic zones, according to an exemplary embodiment of the present disclosure.

FIG. 1B is an illustration of an electronic map 100 including a plurality of geofences, according to an embodiment of the present disclosure. As used herein, the term "geo-fence" or "geofence" may include a virtual geographic zone having one or more perimeters and an area within the perimeter(s). The geofence(s) may or may not be visible to a user viewing an electronic map, but for illustrative purposes, FIG. 1 depicts a number of geofences 104, 106 superimposed over electronic map 100. Fixed location 102 (similar to fixed location 16 described above in relation to FIG. 1A) generates one or both of geofences 104, 106, and may be defined by any type or combination of GPS coordinates, address, road intersection, building, business, POI, venue, public space, or any other location of interest. Geofences 104, 106 may have any predefined radius and may be positioned at, or at any suitable distance from, dynamic display 12. In one embodiment, geofences 104 and 106 may be centered around dynamic display 12. For example, geofences 104 and 106 may quantify and relay the position of an electronic device that is near and approaching dynamic display 12 (as similarly described above in relation to the bus stop example in FIG. 1A). In another embodiment, geofences 104 and 106 may be centered at an intersection selected near dynamic display 12 to monitor the movement of electronic devices in passing vehicles. In yet another embodiment, the geofences 102 and 104 may be centered at any other point or related point within some predetermined distance from dynamic display 12. For example, geofence 102 be centered around an entrance to an underground subway station where signal detection of electronic devices may be limited. Geofence 104 may be placed at an exit of the underground subway station. The movement of potential consumers traveling underground by subway can then be quantified and relayed as they enter and exit the respective subway stations. Content providers may then tailor electronic content transmitted to dynamic displays that may be located at the respective subway station entrances and exits, and/or the digital displays may be located underground along the travel routes of the potential consumers. The respective geofences 104,106 can be similarly placed at airports and/or train stations to quantify and relay the movement of electronic devices as passengers travel between ports and stations.

While FIG. 1B depicts the geofences 104, 106 as being substantially circular, it should be appreciated that each may have any shape, such as a square, a rectangle, polygon, an irregular shape, etc., whether defined by one or more parameters, by a content provider or advertiser, by geographical boundaries, and/or by any other inputs.

As will be discussed in detail below, geofences 104, 106 may be generated according to parameters provided by one or more advertisers or electronic content providers and used to target users with relevant electronic content at the dynamic displays. In one embodiment, the geofence may be generated according to instructions received from an owner, operator, or other affiliate of a target location (e.g., Whole Foods, Safeway, Verizon stores, etc.). Alternatively or additionally, geofences 104, 106 may be generated according to parameters defined by an advertising network, mapping service, and/or geofencing service provider. Geofences 104, 106 may include any area, including one or more portions of various routes on the electronic map 100, such as highways having one or more exits and exit ramps, roads, such as local roads, intersections, or any other navigational or geographic points of interest.

Figure 2:
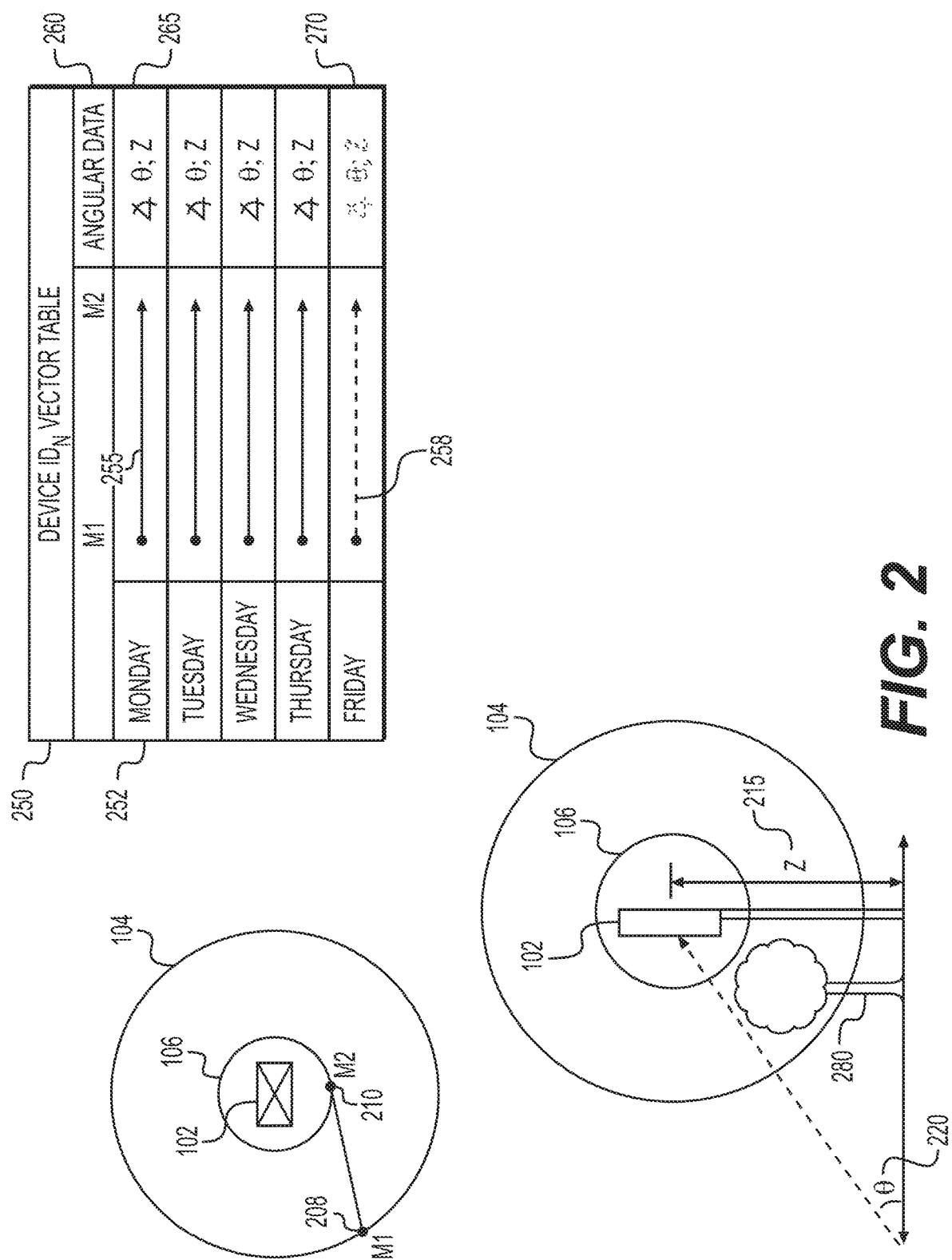
FIG. 2 is an illustration of a methodology for generating directional vectors for quantifying the displacement of electronic devices between a plurality of geofences or geographic zones, according to an exemplary embodiment of the present disclosure.

Of course, it should be appreciated from the description of FIGS. 1B-2 that any of the inner boundaries and outer boundaries may be of any type, configuration, and/or shape. For example, both the inner and outer boundaries may be defined by radii or other lengths or shapes relative to fixed location 102. Alternatively, both the inner and outer boundaries may be defined by travel times and/or distances relative to fixed location 102. Alternatively, the inner boundary may be defined by a radius or distance from fixed location 102, whereas the outer boundary may be defined by a travel time and/or distance relative to fixed location 102. Alternatively, the inner boundary may be defined by a travel time and/or distance relative to fixed location 102, whereas the outer boundary may be defined by a radius or distance from fixed location 102.

Turning to FIG. 2, there is illustrated a method for determining position data, or travel vectors, for electronic devices as they travel between geofences 104, 106, according to an embodiment of the present disclosure. The presence of an electronic device may, for example, be detected at/or within geofence 104 at location M1. The position data 208 of location M1 may then be stored in an electronic device vector table 250. In some embodiments, the position data 208 may include geo-coordinate data, speed data, time data, angular data etc. Angular data 260 may include a viewing angle 220 and/or height information 215 of a digital display 12 (or of a fixed location 102) relative to horizontal plane of the electronic device. The angular data may provide information for determining an optimized height for positioning a digital display 12 over an obstacle 280 that may otherwise block a view of the digital display 12. The presence of the electronic device is subsequently detected at/or within geofence 106 at location M2. The position data 210 of location M2 may then be similarly stored in the electronic device vector table 250. A directional vector 255 may then be generated for the movement of the electronic device by extrapolation based on the position data 208, 210 from locations M1 and M2.

The quantifying and storing of the position data 208, 210, and the generated directional vectors 255 may be repeated for groupings or clusters of electronic devices as they travel through the respective geofences 104, 106. The clusters of electronic devices may be quantified and relayed over a sample period 252 to identify a movement pattern for the electronic devices. Identifying a movement pattern may provide information for predicting an anticipated directional vector 258 (and/or anticipated angular data 270) for similarly situated electronic devices. Content providers may then tailor electronic content targeting potential consumers with electronic devices based on their identifiable travel patterns and/or their predicted travel patterns.

In general, a geographic location of a user is based on detecting the geographic location of an electronic device (e.g., mobile telephone, a cellular telephone, or another device) associated with the user. A cellular system includes geographic location information that includes information on the geographic locations of the electronic devices. This may be accomplished, for example, by storing in a data table, list, or another type of data collection an association between a unique identifier for each of the electronic devices and the geographic location. A unique identifier for electronic devices, for example, may be the telephone number of a mobile telephone, a mobile electronic identity number (MEIN), a mobile identification number (MIN), a proprietary unique identifier (such as an account identifier), or another type of identifier that uniquely identifies a mobile telephone or a mobile telephone subscriber.

The cellular system also is capable of detecting, or receiving indications of, the geographic locations of the electronic devices and storing their geographic locations. In one example, the geographic location of an electronic device is received from the electronic device itself. Additionally or alternatively, the cellular system may detect the geographic location of each of the electronic devices. For example, in one implementation, the cellular system uses triangulation based on perceived distance of the electronic devices from multiple elements of the cellular system (e.g., transmission towers) to determine the geographic locations of the electronic devices. The perceived distance of the electronic devices is calculated from the time needed for signals from the electronic devices to reach the cellular system. In any case, the cellular system stores the geographic locations of the electronic devices.

Figure 3:
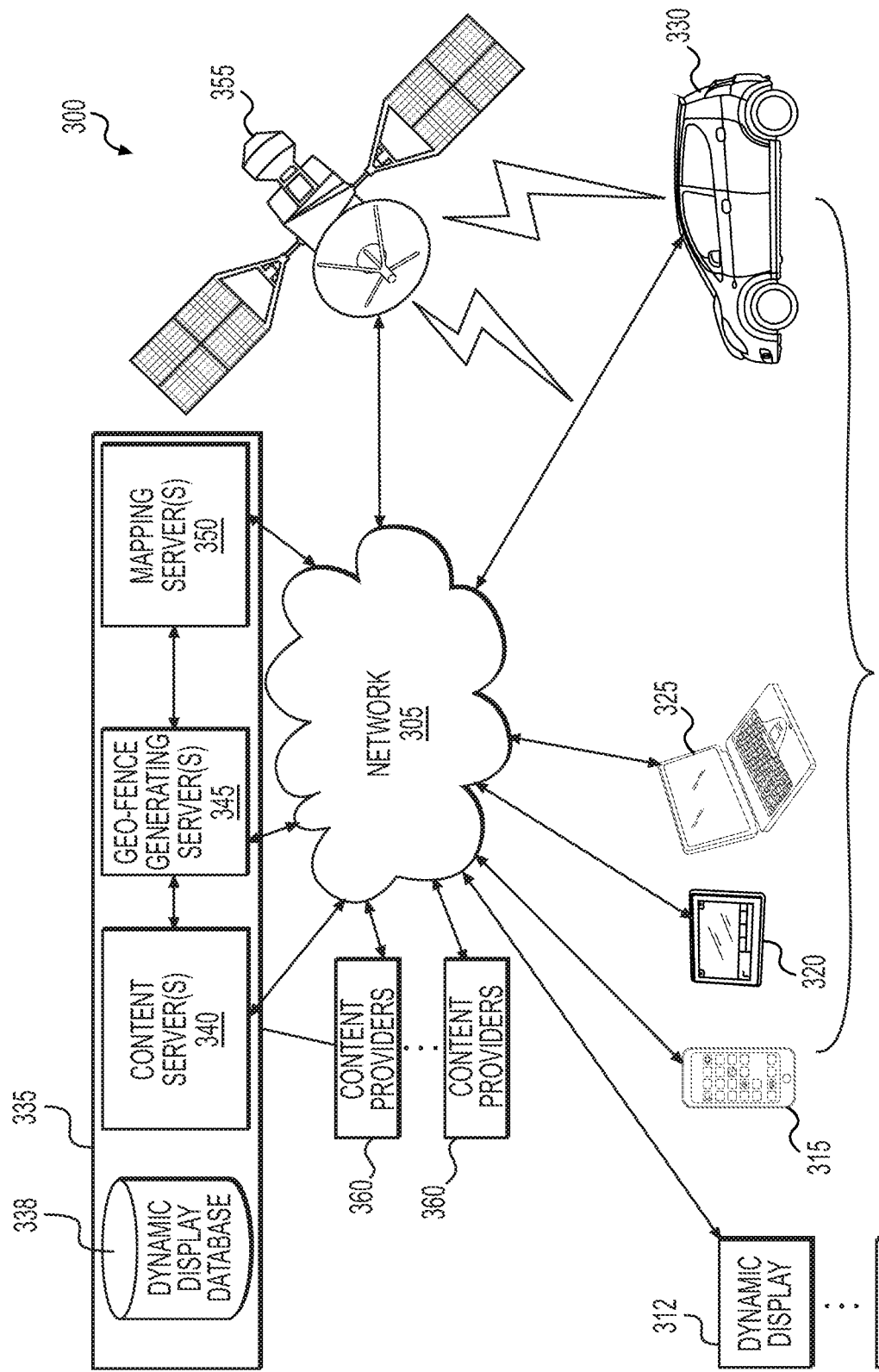
FIG. 3 is a block diagram of a communications environment and systems configured to generate and display electronic content based on individuals traveling between a plurality of geofences or geographic zones, according to an exemplary embodiment of the present disclosure.

FIG. 3 is an illustration of an exemplary environment 300 in which content may be presented to a user's mobile electronic device 310 having GPS and/or a mapping software application. The mobile electronic device 310 may be any device connected to, or capable of connecting to a network 305, such as the Internet. Examples of such mobile electronic devices 310 may include mobile phones 315, in-car or portable GPS devices 320 and 330, computers 325 (e.g., laptops and tablets), smart watches, etc. The mobile electronic devices 310 may send and receive information via the network 305 and/or one or more satellites 355. The mobile electronic devices 310 also may communicate with a system of servers 335 via the network 305. The system of servers 335 may include one or more servers, such as content server(s) 340, geofence generating server(s) 345, and/or mapping server(s) 350 in communication with each other. In addition, the system may include one or more content providers 360 in communication with the server system 335. Examples of content providers may include advertisers, news agencies, government agencies, publishers, etc.

The content server 340 may be in communication with a dynamic display database 338, which may include parameters received from one or more content providers 360 for sending content to dynamic displays 312. Such parameters may include parameters related to the geofence, demographic characteristics of users, and/or any other suitable parameters, or combination of parameters. Examples of parameters related to the geofence may include a travel distance and/or time from the target location, travel direction, travel speed, type of route (e.g., highway, tollway, road, local road, etc.). Examples of parameters related to the demographic information of a user may include vehicle type, average speed of the user, past online search history, driving habits, etc. Examples of other content parameters the content server 340 may receive from one or more content providers 360 may include weather conditions, date, day, time, etc., any of which may be used to control whether and how to transmit electronic content and/or advertising to user devices identified within one or more geofences. Of course, it should be appreciated that any type of business or entity might target geofences to any combination of roads or intersections or locations, at any desired day or time, to target any desired segment of the population, with any relevant electronic content and/or ads. The parameters received by the content server 340 may be processed by the content provider 360 and saved in a database, which may be accessed by the one or more geofence generating servers 345.

The geofence generating server(s) 345 may generate one or more virtual electronic geofences based on the parameters received by the content server 340 and may retrieve relevant mapping information from the mapping server 350 in order to accurately generate the geofence in accordance with the parameters received from the content provider 360. According to various embodiments, the geofence generating server(s) 345 may generate, maintain, and implement any number of geofences, simultaneously, for any number of roads and/or intersections, businesses, promotions, etc. Each geofence maintained by the geofence generating server(s) 345 may have any desired shape, such as the shapes depicted in FIGS. 1B-2, the shape of an annular donut (e.g., a "geodonut"), the shape of portions of one or more road or highway lanes, the shape of an intersection, the shape of a plurality of road/intersection portions, a polygon (or plurality thereof), a rectangle (or plurality thereof), etc. In one embodiment, the geofence generating server(s) 345 may generate the one or more geofences based on inputs received from content server(s) 340, mapping server(s) 350, content provider(s) 360, or any other publishers, advertisers, etc. The geofence generating server(s) 345 may, in combination with the mapping server(s) 350, monitor the location of one more users' devices relative to perimeter/area information associated with each geofence (e.g., relative to both the inner and outer boundaries) to generate and maintain an updated list of the devices that enter and remain within each geofence (e.g., that are within the outer boundary but not within the inner boundary).

The mapping server 350 may store and process information regarding road geometry, road intersections, routing graphs, traffic patterns, road closures, event information, average traffic speed, etc. In addition, the system may be in communication with the electronic devices 310 via the network 305 and/or satellite(s) 355 to receive location, travel, and any other user information that may be used to generate geofences and identify devices within each geofence in accordance with the content parameters. For illustrative purposes only, the server system 335 is shown in FIG. 3 to include servers 340, 345, and 350 in a unitary structure, however, it should be understood that any or all of the servers 340, 345, and 350 may be external to each other and owned and/or operated by different entities, as long as electronic communication may occur within one or more of the servers 340, 345, and 350. Any of servers 340, 345, and 350 may operate in conjunction with each other, and/or perform the functions of each other.

Figure 4:
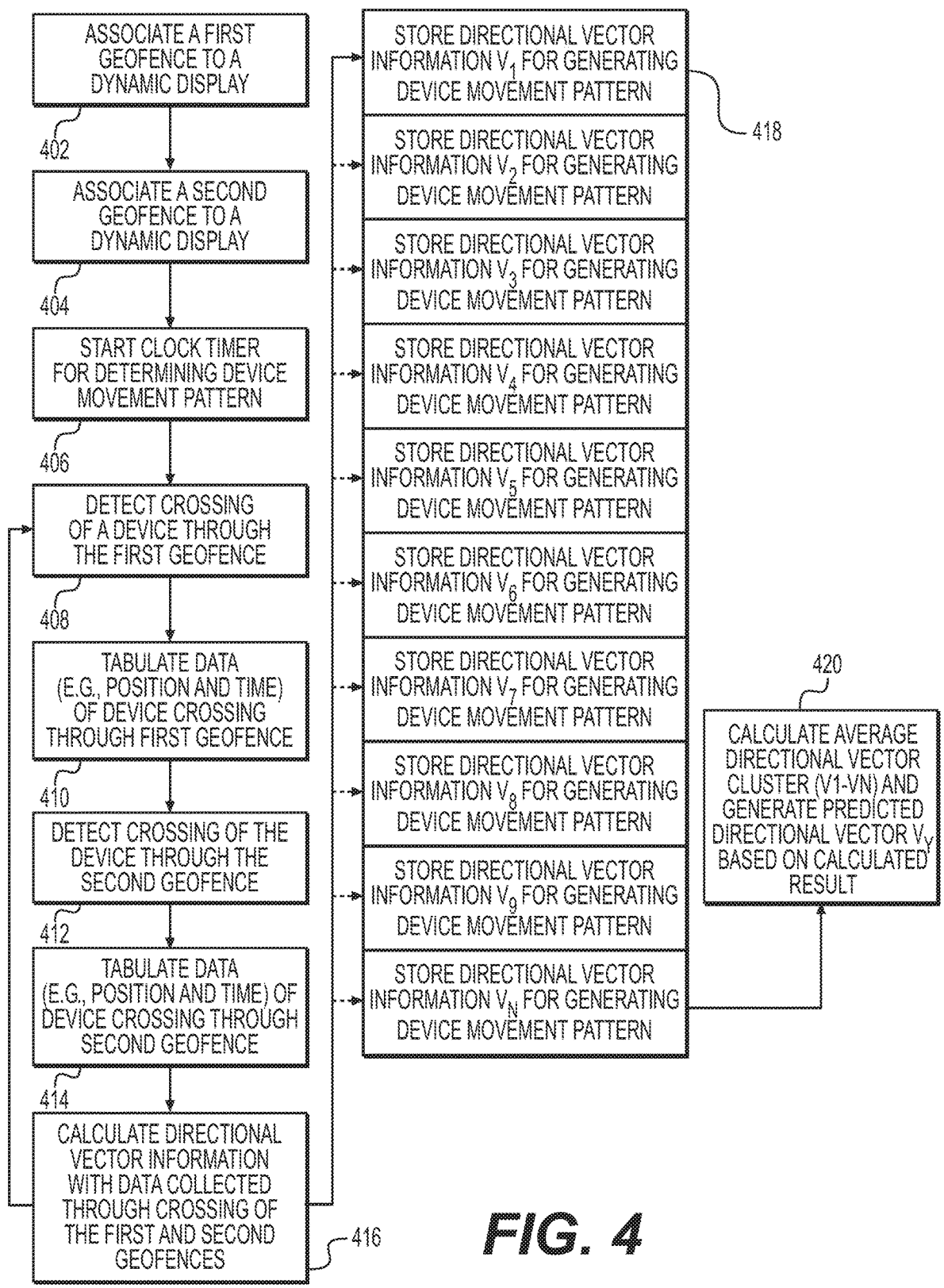
FIG. 4 is a flow diagram of methods for presenting electronic content to individuals based on the displacement of electronic devices traveling between geofences or geographic zones, according to exemplary embodiments of the present disclosure.

FIG. 4 is a flow diagram of a method 400 for transmitting electronic content to dynamic displays based on anticipated travel patterns of potential consumers traveling between predefined geofences, according to an embodiment of present disclosure. The method 400 may include a step 402 of associating a first geofence to a dynamic display for providing a first position information of an electronic device relative to a dynamic display. In some embodiments, the first geofence is defined relative to the position of the dynamic display. In other embodiments, the first geofence is defined relative to the position of a fixed location associated with the dynamic display. In step 404, a second geofence is associated with the dynamic display for providing a second position information of the electronic device relative to the dynamic display. In some embodiments, the second geofence is defined relative to the position of the dynamic display. In other embodiments, the second geofence is defined relative to the position of a fixed location associated with the dynamic display. In step 406, a clock timer may be started to provide temporal information (e.g., time stamp, speed, etc.) for electronic devices identified at/or within the first and second geofences. At step 408, the presence of an electronic device associated with a potential consumer is detected at/or within the first geofence. At step 410, the first position information and temporal information of the first geofence detection is stored in a database. At step 412, the presence of the same electronic device is detected at/or within the second geofence. At step 414, the second position information and temporal information of the second geofence detection is stored in a database.

At step 416 of method 400, a directional vector is generated based on the first position information and the second position information. Steps 408 through 416 are repeated to generate directional vectors for other electronic devices traveling between the first geofence and the second geofence. In step 418, the respective directional vectors generated for each of the detected electronic devices traveling between the first geofence and the second geofence are stored in a database. In step 420, an anticipated directional vector is generated based on an extrapolation of the directional vectors generated in step 416. In some embodiments, the anticipated directional vector is based on an average of the directional vectors stored in step 418. Content providers may then tailor the electronic content transmitted to dynamic displays based on the anticipated directional vectors of potential consumers and their electronic devices.

Figure 5:
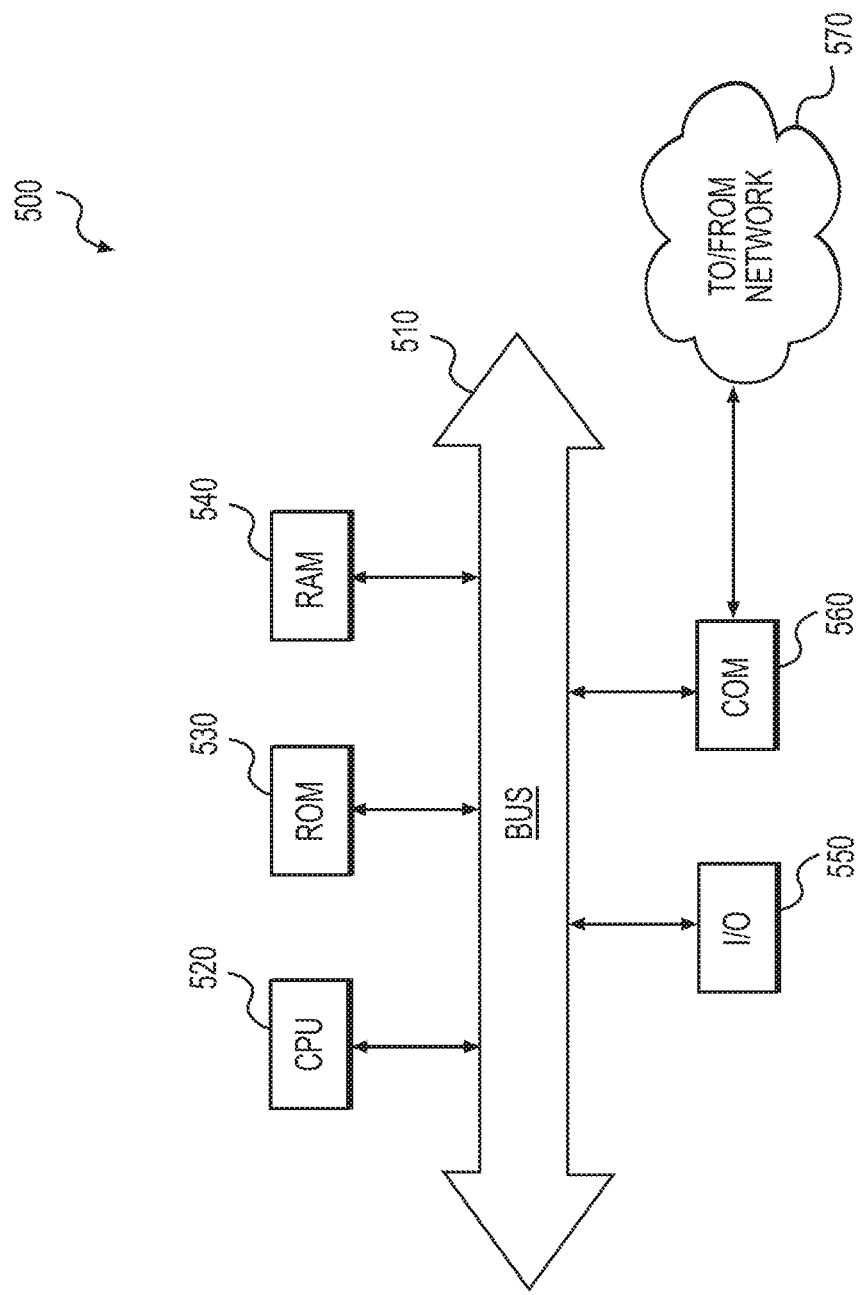
FIG. 5 is a simplified functional block diagram of a computer configured as a content, geofence generating, and/or mapping server, for example, for presenting electronic content to individuals with electronic devices traveling between geofences or geographic zones, according to exemplary embodiments of the present disclosure.

FIG. 5 provides a functional block diagram illustration of computer hardware platforms consistent with any of the devices and servers described herein. FIG. 5 illustrates a network or host computer platform 500, as may typically be used to implement a server. It is believed that those skilled in the art are familiar with the structure, programming, and general operation of such computer equipment and as a result, the drawings should be self-explanatory.

A platform for a server or the like 500, for example, may include a data communication interface for packet data communication 560. The platform may also include a central processing unit (CPU) 520, in the form of one or more processors, for executing program instructions. The platform typically includes an internal communication bus 510, program storage, and data storage for various data files to be processed and/or communicated by the platform such as ROM 530 and RAM 540, although the server 500 often receives programming and data via network communications 570. The hardware elements, operating systems, and programming languages of such equipment are conventional in nature, and it is presumed that those skilled in the art are adequately familiar therewith. The server 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the electronic device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method for executing an electronic distribution of electronic content to a dynamic display, the method comprising:
   receiving, from a content provider, a request to transmit electronic content to the dynamic display, wherein the dynamic display is associated with a fixed location, wherein the electronic content is directed to a desired subset of individuals associated with a plurality of electronic devices, and wherein the electronic content relates to a target location affiliated with the content provider;
   identifying a first geographical zone associated with the fixed location;
   identifying a second geographical zone associated with the fixed location;
   quantifying a movement of one or more of the plurality of electronic devices relative to one or more of the first geographical zone and the second geographical zone, using first position information and second position information for each of the one or more of the plurality of electronic devices relative to one or more of the first geographical zone and the second geographical zone;
   predicting anticipated movement of the one or more of the plurality of electronic devices, based on the quantified movement of the one or more of the plurality of electronic devices;
   identifying a pattern associated with movement of the one or more of the plurality of electronic devices relative to one or more of the first geographical zone and the second geographical zone and the predicted anticipated movement of the one or more of the plurality of electronic devices relative to one or more of the first geographical zone and the second geographical zone;
   tailoring the electronic content based on the identified pattern associated with the movement; and
   transmitting the tailored electronic content to the dynamic display associated with the fixed location, wherein the dynamic display is configured to display the transmitted electronic content to the desired subset of individuals.

2. The method of claim 1, wherein at least one of the first geographical zone and the second geographical zone is positioned within an immediate zone relative to the fixed location.

3. The method of claim 2, wherein at least one or both of the first geographical zone and the second geographical zone is circular.

4. The method of claim 3, wherein at least one or both of the first geographical zone and the second geographical zone is defined by a radius around the fixed location.

5. The method of claim 2, wherein at least one or both of the first geographical zone and the second geographical zone is a polygon.

6. The method of claim 1, wherein the first geographical zone is positioned within an immediate zone relative to the fixed location, and the second geographical zone is positioned at a remote location relative to the fixed location.

7. The method of claim 6, wherein at least one or both of the first geographical zone and the second geographical zone is circular.

8. The method of claim 6, wherein at least one or both of the first geographical zone and the second geographical zone is a polygon.

9. The method of claim 1, wherein at least one of the first geographical zone and the second geographical zone is positioned at a remote location relative to the fixed location.

10. The method of claim 9, wherein at least one or both of the first geographical zone and the second geographical zone is circular.

11. The method of claim 9, wherein at least one or both of the first geographical zone and the second geographical zone is a polygon.

12. The method of claim 1, wherein at least one or both of the first position information and the second position information comprises geo-coordinates identifying the location of the one or more of the plurality of electronic devices relative to the fixed location.

13. The method of claim 12, wherein at least one or both of the first position information and the second position information further comprises a time period.

14. The method of claim 13, wherein at least one or both of the first position information and the second position information further comprises angular data measuring an angular distance of the one or more of the plurality of electronic devices relative to a height of the dynamic display.

15. The method of claim 1, wherein the first geographical zone is associated with a first access point of a transit station of a transit mode, and the second geographical zone is a second access point of the transit station, and wherein the desired subset of individuals travel between the first access point and the second access point via the transit mode.

16. A system for managing an electronic distribution of electronic content to a dynamic display, the system comprising:
  a data storage device storing instructions for managing the electronic distribution of electronic content to the dynamic display, wherein the dynamic display is associated with a fixed location; and
  a processor configured to execute the instructions to perform a method comprising:
    receiving, from a content provider, a request to transmit electronic content to the dynamic display, wherein the dynamic display is associated with a fixed location, wherein the electronic content is directed to a desired subset of individuals associated with a plurality of electronic devices, and wherein the electronic content relates to a target location affiliated with the content provider;
    identifying a first geographical zone associated with the fixed location;
    identifying a second geographical zone associated with the fixed location;
    quantifying a movement of one or more of the plurality of electronic devices relative to one or more of the first geographical zone and the second geographical zone, using first position information and second position information for each of the one or more of the plurality of electronic devices relative to one or more of the first geographical zone and the second geographical zone;
    predicting anticipated movement of the one or more of the plurality of electronic devices, based on the quantified movement of the one or more of the plurality of electronic devices;
    identifying a pattern associated with movement of the one or more of the plurality of electronic devices relative to one or more of the first geographical zone and the second geographical zone and the predicted anticipated movement of the one or more of the plurality of electronic devices relative to one or more of the first geographical zone and the second geographical zone;
    tailoring the electronic content based on the identified pattern associated with the movement; and
    transmitting the tailored electronic content to the dynamic display associated with the fixed location, wherein the dynamic display is configured to display the transmitted electronic content to the desired subset of individuals.

17. The system of claim 16, wherein at least one of the first geographical zone and the second geographical zone is positioned within an immediate zone relative to the fixed location.

18. The system of claim 16, wherein the first geographical zone is positioned within an immediate zone relative to the fixed location, and the second geographical zone is positioned at a remote location relative to the fixed location.

19. The system of claim 16, wherein at least one of the first geographical zone and the second geographical zone is positioned at a remote location locations relative to the fixed location.

20. A computer-readable medium that, when executed by a computer system, causes the computer system to perform a method for managing an electronic distribution of electronic content to a dynamic display, the method including:
  receiving, from a content provider, a request to transmit electronic content to the dynamic display, wherein the dynamic display is associated with a fixed location, wherein the electronic content is directed to a desired subset of individuals associated with a plurality of electronic devices, and wherein the electronic content relates to a target location affiliated with the content provider;
  identifying a first geographical zone associated with the fixed location;
  identifying a second geographical zone associated with the fixed location;
  quantifying a movement of one or more of the plurality of electronic devices relative to one or more of the first geographical zone and the second geographical zone, using first position information and second position information for each of the one or more of the plurality of electronic devices relative to one or more of the first geographical zone and the second geographical zone;
  predicting anticipated movement the one or more of the plurality of electronic devices, based on the quantified movement of the one or more of the plurality of electronic devices;
  identifying a pattern associated with movement of the one or more of the plurality of electronic devices relative to one or more of the first geographical zone and the second geographical zone and the predicted anticipated movement of the one or more of the plurality of electronic devices relative to one or more of the first geographical zone and the second geographical zone;
  tailoring the electronic content based on the identified pattern associated with the movement; and
  transmitting the tailored electronic content to the dynamic display associated with the fixed location, wherein the dynamic display is configured to display the transmitted electronic content to the desired subset of individuals.

* * * * *